United States Patent
Ohtake

(10) Patent No.: US 9,306,383 B2
(45) Date of Patent: Apr. 5, 2016

(54) LOW CURRENT PROTECTION CIRCUIT

(71) Applicant: Sanken Electric Co., LTD., Niiza-shi, Saitama (JP)

(72) Inventor: Osamu Ohtake, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 69 days.

(21) Appl. No.: 14/341,926

(22) Filed: Jul. 28, 2014

(65) Prior Publication Data

US 2015/0029628 A1     Jan. 29, 2015

(30) Foreign Application Priority Data

Jul. 29, 2013   (JP) .................. 2013-156639

(51) Int. Cl.
| | |
|---|---|
| *H02H 3/00* | (2006.01) |
| *H02H 3/027* | (2006.01) |
| *H02H 3/12* | (2006.01) |
| *H02H 3/26* | (2006.01) |
| *G05D 25/02* | (2006.01) |
| *H05B 33/08* | (2006.01) |

(52) U.S. Cl.
CPC .............. *H02H 3/027* (2013.01); *G05D 25/02* (2013.01); *H02H 3/12* (2013.01); *H02H 3/26* (2013.01); *H05B 33/0818* (2013.01); *H05B 33/0884* (2013.01)

(58) Field of Classification Search
CPC ...................................... H02H 3/027
USPC ........................................... 361/18
See application file for complete search history.

(56) References Cited

U.S. PATENT DOCUMENTS

| | | | |
|---|---|---|---|
| 6,844,760 B2 | 1/2005 | Koharagi et al. | |
| 6,903,536 B2* | 6/2005 | Yang .................. | H02M 1/4225 323/266 |
| 8,120,343 B2* | 2/2012 | Kunimatsu ............. | H02M 1/36 323/282 |
| 8,174,854 B2* | 5/2012 | Sugahara ................ | H02M 1/32 323/351 |
| 8,547,028 B2* | 10/2013 | Ohtake ............. | H02M 3/33507 315/200 R |
| 2004/0124889 A1 | 7/2004 | Koharagi et al. | |

FOREIGN PATENT DOCUMENTS

JP         2004-147435 A       5/2004

* cited by examiner

*Primary Examiner* — Stephen W Jackson
(74) *Attorney, Agent, or Firm* — Banner & Witcoff, Ltd.

(57) ABSTRACT

A low current protection circuit is configured to detect a lowering of a load current flowing a load to perform a low current protection operation and includes: a load current detection configured to detect a load current; a low current detection configured to detect a lowering of the load current by comparing the load current detected by the load current detection unit and a preset reference value; a protection unit configured to perform the low current protection operation when the lowering of the load current is detected by the low current detection unit; and a masking unit configured to mask the low current protection operation of the protection unit from when the lowering of the load current is detected by the low current detection unit to when a masking time period depending on a duty ratio of the external pulse signal elapses.

4 Claims, 5 Drawing Sheets

LOW CURRENT PROTECTION CIRCUIT

CROSS-REFERENCE TO RELATED APPLICATION

This application claims priority from Japanese Patent Application No. 2013-156639 filed on Jul. 29, 2013, the entire subject matter of which is incorporated herein by reference.

TECHNICAL FIELD

This disclosure relates to a low current protection circuit incorporated in a constant-current power-supply device that drives a load with a constant current by a pulse signal (hereinafter, referred to as a PWM signal) obtained through a PWM (Pulse Width Modulation) control.

BACKGROUND

An LED (Light Emitting Diode) has a characteristic that a color tone thereof is changed depending on a current magnitude. Therefore, the LED is generally driven with a constant current. When performing a dimming control, the LED is turned on-and-off by a PWM signal, which is an external pulse signal, and a light quantity is adjusted by a duty ratio of the PWM signal.

In the meantime, when a switching power source is used as a constant-current power-supply device for driving a load with a constant current, it is necessary to perform a feedback control by detecting an output current. As described above, when the LED is driven by the PWM signal, the LED repeats a turning-on period and a turning-off period. During the turning-off period, the current does not flow through the LED, so that the zero output current is fed back. In this way, when the zero output current is fed back, the excess power is fed. In view of the above, a technology is disclosed that the feedback control performed only during the turning-on period of the LED to thus suppress the excess power from being fed (for example, refer to JP-A-2004-147435).

JP-A-2004-147435 discloses a non-isolated booster chopper-type switching power source. During an on-period in which the LED is turned on, an operating current is supplied based on an LED operating current indication value. During an off-period in which the LED is turned off, the LED and a supply voltage are separated by an n-type MOS transistor and a switching operation of the switching power source, which is an LED supply voltage source, is synchronously turned off. In this way, according to JP-A-2004-147435, the switching power source is turned on-and-off in synchronization with the PWM signal to reduce power consumption at a standby state.

SUMMARY

As described above, when a low current (UV) protection circuit for detecting an abnormality due to a lowering of a load current flowing through the load is incorporated in the constant-current power-supply device which supplies the power from an input-side to an output-side in synchronization with the external pulse signal turning on-and-off the load and drives the load with the set constant current by using the power supplied to the output-side, a predetermined load current does not flow during a time period during which an output voltage upon startup increases from zero to a predetermined voltage. As a result, the abnormality detection is not performed. Therefore, it is necessary to temporarily mask the abnormality detection of the low current protection circuit and then to perform the abnormality detection only when the lowering of the load current continues for a predetermined time period or longer.

In this case, when a duty ratio of the PWM signal is high, the output voltage can sufficiently increase in a short time. However, when the duty ratio of the PWM signal is low, it takes much time for the output voltage to increase, so that it is necessary to highly prolong a masking time period during which the abnormality detection is masked.

However, if the masking time period during which the abnormality detection is masked is prolonged, when the duty ratio of the PWM signal of a continuous operation and the like is high, the abnormality detection is performed, so that a component may be damaged due to heat generation and the like before the low current protection operation is made.

This disclosure is to provide a low current protection circuit capable of appropriately setting a masking time period during which an abnormality detection is masked, depending on a duty ratio of an external pulse signal.

A low current protection circuit of this disclosure is provided in a constant-current power-supply device that supplies power from an input-side to an output-side in synchronization with an external pulse signal turning on-and-off the load and drive load with a set constant current by using the power supplied to the output-side and is configured to detect a lowering of a load current flowing a load to perform a low current protection operation. The low current protection circuit includes: a load current detection configured to detect the load current; a low current detection configured to detect the lowering of the load current by comparing the load current detected by the load current detection unit and a preset reference value; a protection unit configured to perform the low current protection operation when the lowering of the load current is detected by the low current detection unit; and a masking unit configured to mask the low current protection operation of the protection unit from when the lowering of the load current is detected by the low current detection unit to when a masking time period depending on a duty ratio of the external pulse signal elapses.

Further, in the low current protection circuit of this disclosure, the masking time period when the duty ratio of the external pulse signal is low may be set to be longer than the masking time period when the duty ratio of the external pulse signal is high.

Further, in the low current protection circuit of this disclosure, the masking time period may be set to a time period until cumulative time of an on-duty of the external pulse signal becomes a predetermined time.

According to this disclosure, it is possible to appropriately set a masking time period during which an abnormality detection is masked, depending on a duty ratio of an external pulse signal, to suppress a false detection by prolonging the masking time period when the duty ratio of the external pulse signal is low and also to rapidly perform the abnormality detection by shortening the masking time period when the duty ratio of the external pulse signal is high, thereby suppressing a component from being damaged due to heat generation and the like.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, illustrative embodiments of this disclosure will be described with reference to the drawings.

Figure 1:
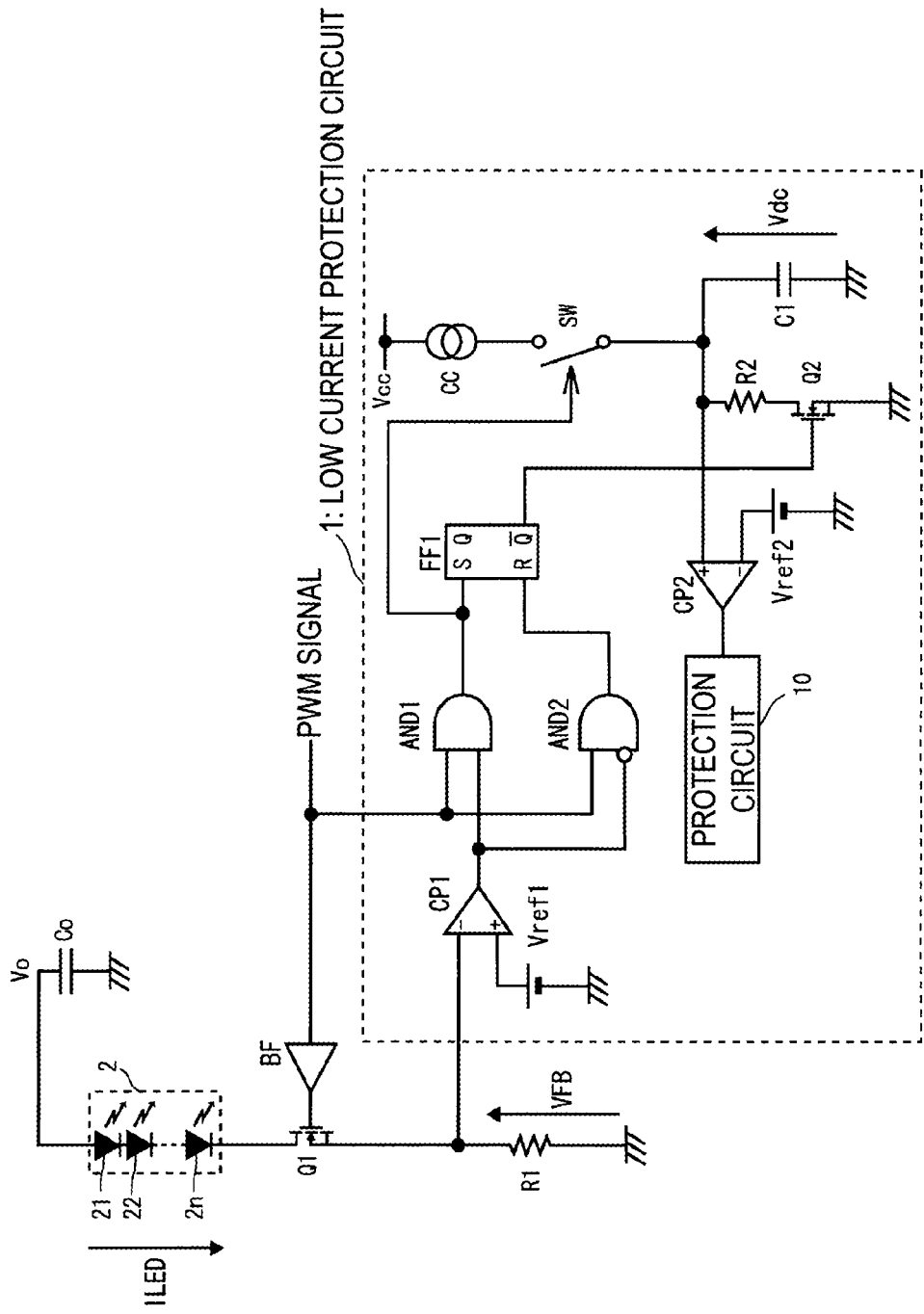
FIG. 1 is a circuit configuration view illustrating a circuit configuration in an illustrative embodiment of the low current protection circuit of this disclosure.

Referring to FIG. 1, a low current protection circuit 1 of this illustrative embodiment is installed in a constant-current power-supply device (not shown) which drives an LED array 2, in which n LEDs (n: is a natural number) 21 to 2n are connected in series, with a constant current, based on a PWM signal such as a dimming signal of an external pulse signal. In the meantime, the PWM signal is an external pulse signal and a dimming signal determining brightness of the LED array 2 by a duty ratio of the signal.

The LED array 2, an N-type MOSFET (hereinafter, referred to as NMOS) Q1 and a detection resistance R1 for detecting a voltage VFB corresponding to a load current flowing through a load, i.e., an LED current ILED flowing through the LED array 2 are connected in series between a positive terminal of an output-side capacitor Co of the constant-current power-supply device (not shown) and a ground GND. The power is supplied to the output-side capacitor Co from an input-side in synchronization with the PWM signal turning on-and-off the LED array 2 that is a load.

A drain terminal of the NMOS Q1 is connected to a cathode-side terminal of the LED array 2 and a source terminal of the NMOS Q1 is connected to the ground GND via the resistance R1. Also, a gate terminal of the NMOS Q1 is input with the PWM signal serving as an LED driving signal via a buffer BF. Thereby, the NMOS Q1 is turned on-and-off by the LED driving signal based on the PWM signal, and the LED array 2, which is a load, is turned on-and-off with the set constant current in synchronization with the PWM signal.

Referring to FIG. 1, the low current protection circuit 1 has comparators CP1, CP2, a reference voltage Vref1, a reference voltage Vref2, AND circuits AND1, AND2, a switch SW, a capacitor C1, a constant current circuit CC, a resistance R2, an NMOS Q2, an RS-type flip-flop circuit FF1 and a protection circuit 10.

A connection point of the source terminal of the NMOS Q1 and the detection resistance R1 is connected to an inverting input terminal of the comparator CP1 and the reference voltage Vref1 is connected to a non-inverting input terminal of the comparator CP1. The reference voltage Vref1 is a threshold voltage for detecting a lowering of the LED current ILED flowing to the LED array 2.

An output terminal of the comparator CP1 is connected to one input terminal of the AND circuit AND1 and one inverting input terminal of the AND circuit AND2. The PWM signal is input to the other input terminal of the AND circuit AND1 and the other input terminal of the AND circuit AND2.

The comparator CP1 compares the voltage VFB and the reference voltage Vref1, and an output of the comparator CP1 becomes an H level when the voltage VFB is lower than the reference voltage Vref1 and becomes an L level when the voltage VFB is the reference voltage Vref1 or higher. Thereby, an output of the AND circuit AND1 functions as an abnormality detection signal detecting a low current and becomes an H level when the voltage VFB is lower than the reference voltage Vref1 and when the PWM signal is in on-duty. An output of the AND circuit AND2 becomes an H level when the voltage VFB is the reference voltage Vref1 or higher and when the PWM signal is in on-duty.

The switch SW that is turned on-and-off by the output of the AND circuit AND1 and the capacitor C1 are connected in series between the constant current circuit CC and the ground GND, and the resistance R2 and the NMOS Q2 are connected in series between a connection point of the switch SW and the capacitor C1 and the ground GND. The output of the AND circuit AND1 is connected to a set terminal S of the RS-type flip-flop circuit FF1, the output of the AND circuit AND2 is connected to a reset terminal R of the RS-type flip-flop circuit FF1 and an output from an inverting output terminal Q⁻ of the flip-flop circuit FF1 is connected to a gate terminal of the NMOS Q2. Thereby, when the output of the AND circuit AND1 becomes an H level, the flip-flop circuit FF1 is set, so that the NMOS Q2 becomes off and the switch SW becomes on. Therefore, a charging of the capacitor C1 starts. Thereafter, while the voltage VFB is being continuously lower than the reference voltage Vref1, the capacitor C1 is charged with the constant current only when the PWM signal is at the on-duty. Also, when the output of the AND circuit AND2 becomes an H level, the flip-flop circuit FF1 is reset, so that the NMOS Q2 becomes on and the electrical charges charged in the capacitor C1 are discharged.

The connection point of the switch SW and the capacitor C1 is connected to a non-inverting input terminal of the comparator CP2 and the reference voltage Vref2 is connected to an inverting input terminal of the comparator CP2. An output of the comparator CP2 is input to the protection circuit 10. The protection circuit 10 is a circuit that executes a low current protection operation of stopping the operation of the constant-current power-supply device when the output of the comparator CP2 becomes an H level. That is, a time period from when the charging of electrical charges for the capacitor C1 starts to when the voltage VFB exceeds the reference voltage Vref2 becomes a masking time period during which an abnormality detection signal output from the AND circuit AND1 is masked.

Figure 2:
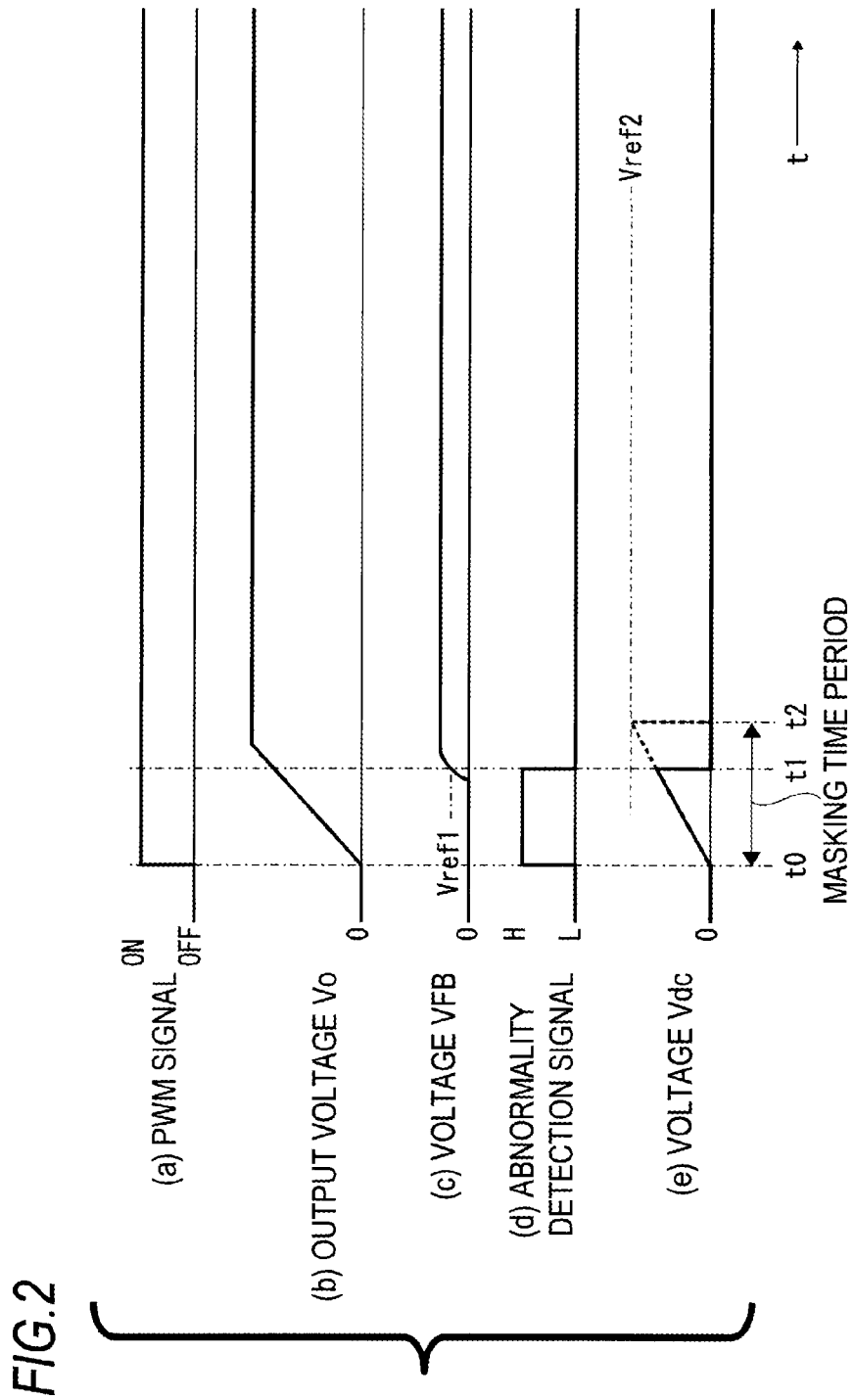
FIG. 2 is a waveform view illustrating signal waveforms and operating waveforms of respective units when a duty ratio is 100% in the low current protection circuit shown in FIG. 1.
Figure 3:
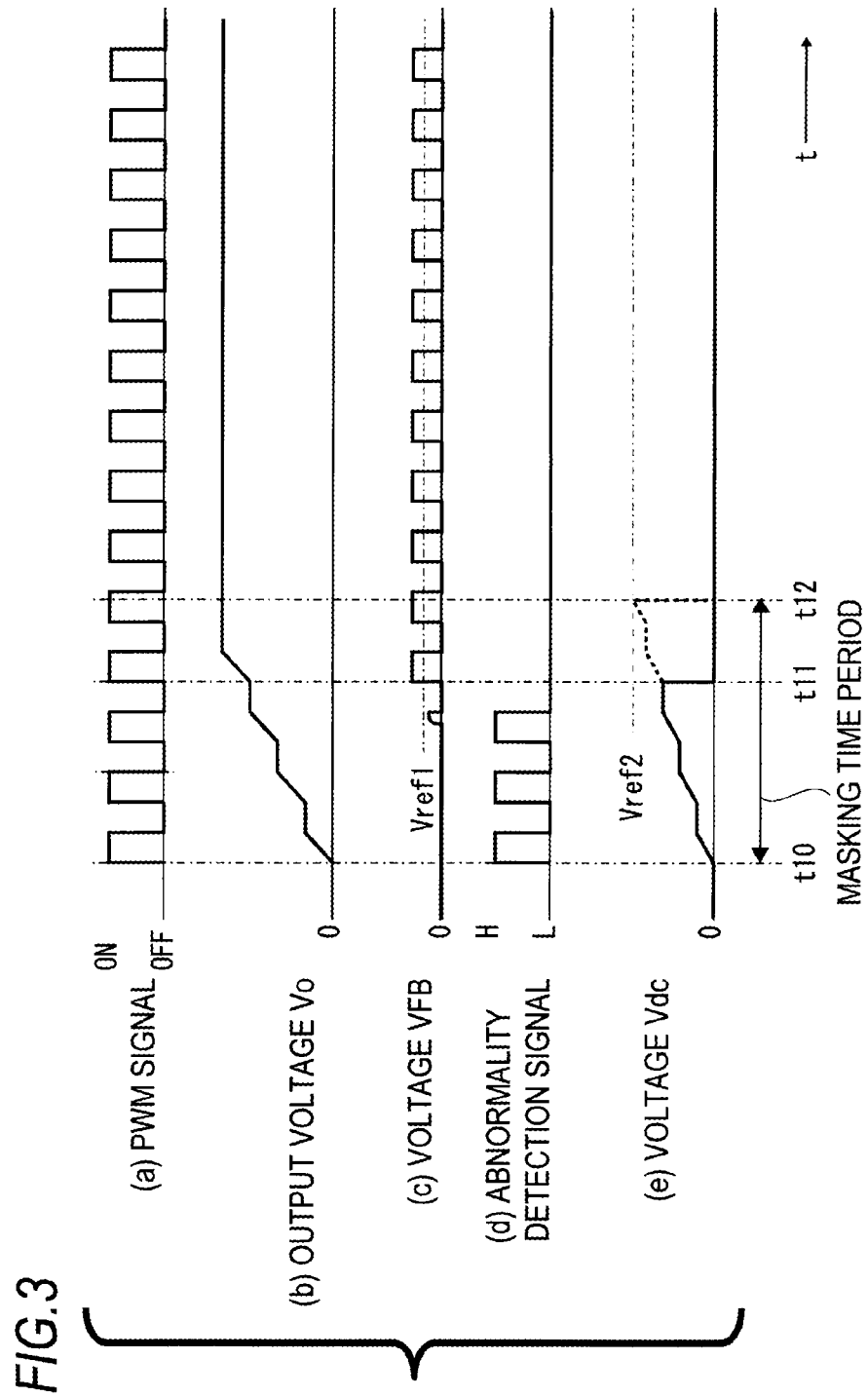
FIG. 3 is a waveform view illustrating signal waveforms and operating waveforms of respective units when the duty ratio is 50% in the low current protection circuit shown in FIG. 1.
Figure 4:
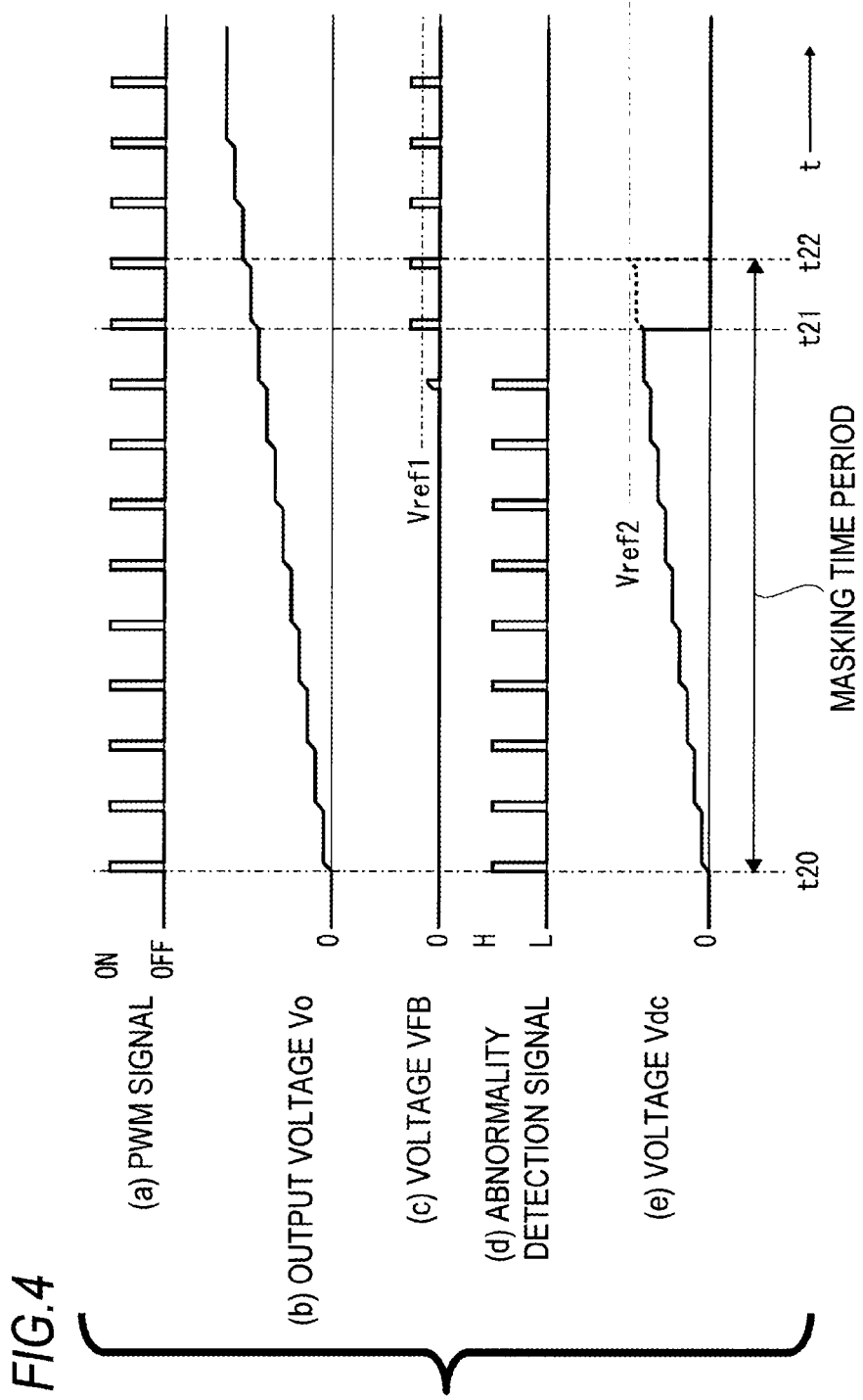
FIG. 4 is a waveform view illustrating signal waveforms and operating waveforms of respective units when the duty ratio is 15% in the low current protection circuit shown in FIG. 1.

FIGS. 2 to 4 show a starting sequence upon startup of the low current protection circuit 1 of this illustrative embodiment, in which FIG. 2 shows a case where the duty ratio of the PWM signal is 100%, FIG. 3 shows a case where the duty ratio of the PWM signal is 50% and FIG. 4 shows a case where the duty ratio of the PWM signal is 15%. Also, in FIGS. 2 to 4, a chart (a) indicates a PWM signal, a chart (b) indicates an output voltage Vo, a chart (c) indicates a voltage VFB, a chart (d) indicates an abnormality detection signal and a chart (e) indicates a voltage Vdc. Hereinafter, each of the charts is referred such as FIG. 2(a), FIG. 2(b) and the like.

As shown in FIG. 2(a), when a PWM signal of a duty ratio 100% is input at time point t0, the power is supplied from an input-side to an output-side in synchronization with the PWM signal and the output voltage Vo starts to increase, as shown in FIG. 2(b). As shown in FIG. 2(d), the abnormality detection signal, which is an output of the AND circuit AND1, becomes an H level when the PWM signal is in an on-duty until a time point t1 where the output voltage Vo is sufficiently increased, the LED current ILED thus starts to flow and the voltage VFB reaches the reference voltage Vref1, as shown in FIG. 2(c).

When the abnormality detection signal, which is an output of the AND circuit AND1, becomes an H level, the flip-flop circuit FF1 is set, so that the NMOS Q2 becomes off and the switch SW becomes on. Therefore, as shown in FIG. 2(e), the charging of electrical charges for the capacitor C1 starts, so that the voltage Vdc starts to increase. Thereafter, since the switch SW continues to be on when the duty ratio is 100%, the electrical charges are continuously charged in the capacitor C1.

Then, when the voltage VFB reaches the reference voltage Vref1 at time point t1, the flip-flop circuit FF1 is reset, so that the NMOS Q2 becomes on. As shown in FIG. 2(e), the electrical charges charged in the capacitor C1 are discharged and thus the voltage Vdc is lowered before it reaches the reference voltage Vref2 and the output of the comparator CP2 becomes an H level. Thereby, the abnormality detection signal that is output from the AND circuit AND1 upon the startup is masked.

On the other hand, when the voltage VFB does not reach the reference voltage Vref1, the voltage Vdc continues to increase, as shown with the dotted line in FIG. 2(e). When the voltage Vdc reaches the reference voltage Vref2 at time point t2, the output of the comparator CP2 becomes an H level and the low current protection operation of the protection circuit 10 is performed. In other words, when the voltage VFB reaches the reference voltage Vref1 up to time point t2, the abnormality detection is not performed and a time period from time point t0 to time point t2 becomes the masking time period. In the meantime, the masking time period is determined based on a current value of the constant current circuit CC determining an increase rate of the voltage VFB, i.e., a charging rate of the capacitor C1, a capacity of the capacitor C1 and the reference voltage Vref2. Therefore, the current value of the constant current circuit CC, the capacity of the capacitor C1 and the reference voltage Vref2 are set so that a time period from time point t0 to time point t2 from when the charging of electrical charges for the capacitor C1 starts to when the voltage Vdc reaches the reference voltage Vref2 is longer than the time period from time point t0 to time point t1 from when starting up to when the voltage VFB reaches the reference voltage Vref1, which is the low current protection starting voltage.

Then, as shown in FIG. 3(a), when a PWM signal of a duty ratio 50% is input at time point t10, the power is supplied from the input-side to the output-side in synchronization with the PWM signal and the output voltage Vo starts to increase, as shown in FIG. 3(b). As shown in FIG. 3(d), the abnormality detection signal, which is an output of the AND circuit AND1, becomes an H level when the PWM signal is in an on-duty until at time point t11 where the output voltage Vo is sufficiently increased, the LED current ILED thus starts to flow and the voltage VFB reaches the reference voltage Vref1, as shown in FIG. 3(c).

When the abnormality detection signal, which is an output of the AND circuit AND1, becomes an H level, the flip-flop circuit FF1 is set, so that the NMOS Q2 becomes off and the switch SW becomes on. Therefore, as shown in FIG. 3(e), the charging of electrical charges for the capacitor C1 starts, so that the voltage Vdc starts to increase. Thereafter, in case where the duty ratio is 50%, the switch SW becomes on only while it is in the on-duty, so that the electrical charges are intermittently charged in the capacitor C1.

Then, when the voltage VFB reaches the reference voltage Vref1 at time point 01, the flip-flop circuit FF1 is reset, so that the NMOS Q2 becomes on. As shown in FIG. 3(e), the electrical charges charged in the capacitor C1 are discharged and thus the voltage Vdc is lowered before it reaches the reference voltage Vref2 and the output of the comparator CP2 becomes an H level. Thereby, the abnormality detection signal that is output from the AND circuit AND1 upon the startup is masked even when the PWM signal of the duty ratio 50% is input.

On the other hand, when the voltage VFB does not reach the reference voltage Vref1, the voltage Vdc continues to intermittently increase, as shown with the dotted line in FIG. 3(e). When the voltage Vdc reaches the reference voltage Vref2 at time point t12, the output of the comparator CP2 becomes an H level and the low current protection operation of the protection circuit 10 is performed. In other words, when the voltage VFB reaches the reference voltage Vref1 up to time point t12, the abnormality detection is not performed and a time period from time point t10 to time point t12 becomes the masking time period. In the meantime, as shown in FIG. 3(b), the output voltage Vo increases only while the PWM signal is in the on-duty during which the power is supplied from the input-side. The time period from time point t10 to time point t11 where the voltage VFB reaches the reference voltage Vref1 is prolonged, compared to the time period from time point t0 to time point t1 when the PWM signal of the duty ratio 100% is input, and the time period during which the abnormality detection signal is set in an H level is also prolonged. Thus, when the duty ratio is 50%, since the electrical charges are charged in the capacitor C1 only while the PWM signal is in the on-duty, the masking time period is also prolonged, compared to a case where the duty ratio is 100%.

Next, as shown in FIG. 4(a), when a PWM signal of a duty ratio 15% is input at time point t20, the power is supplied from the input-side to the output-side in synchronization with the PWM signal and the output voltage Vo starts to increase, as shown in FIG. 4(b). As shown in FIG. 4(d), the abnormality detection signal, which is an output of the AND circuit AND1, becomes an H level when the PWM signal is in an on-duty until at time point t21 where the output voltage Vo is sufficiently increased, the LED current ILED thus starts to flow and the voltage VFB reaches the reference voltage Vref1, as shown in FIG. 4(c).

When the abnormality detection signal, which is an output of the AND circuit AND1, becomes an H level, the flip-flop circuit FF1 is set, so that the NMOS Q2 becomes off and the switch SW becomes on. Therefore, as shown in FIG. 4(e), the charging of electrical charges for the capacitor C1 starts, so that the voltage Vdc starts to increase. Thereafter, in case where the duty ratio is 15%, the switch SW becomes on only while it is in the on-duty, so that the electrical charges are intermittently charged in the capacitor C1.

Then, when the voltage VFB reaches the reference voltage Vref1 at time point t21, the flip-flop circuit FF1 is reset, so that the NMOS Q2 becomes on. As shown in FIG. 4(e), the electrical charges charged in the capacitor C1 are discharged and thus the voltage Vdc is lowered before it reaches the reference voltage Vref2 and the output of the comparator CP2 becomes an H level. Thereby, the abnormality detection signal that is output from the AND circuit AND1 upon the startup is masked even in the PWM signal of the duty ratio 15% is input.

On the other hand, when the voltage VFB does not reach the reference voltage Vref1, the voltage Vdc continues to intermittently increase, as shown with the dotted line in FIG. 4(e). When the voltage Vdc reaches the reference voltage Vref2 at time point t22, the output of the comparator CP2 becomes an H level and the low current protection operation of the protection circuit 10 is performed. In other words, when the voltage VFB reaches the reference voltage Vref1 up to time point t22, the abnormality detection is not performed and a time period from time point t20 to time point t22 becomes the masking time period. In the meantime, as shown in FIG. 4(b), the output voltage Vo increases only while the PWM signal is in the on-duty during which the power is supplied from the input-side. The time period from time point t20 to time point t21 where the voltage VFB reaches the reference voltage Vref1 is further prolonged, compared to the time period from time point t10 to time point t11 when the PWM signal of the duty ratio 50% is input, and the time period during which the abnormality detection signal is set in an H level is also prolonged. Thus, in case where the duty ratio is 15%, the time period for during which the electrical charges are charged in the capacitor C1 at once is shorter, compared to when the duty ratio is 50%, the masking time period is further prolonged, compared to when the duty ratio is 50%.

Figure 5:
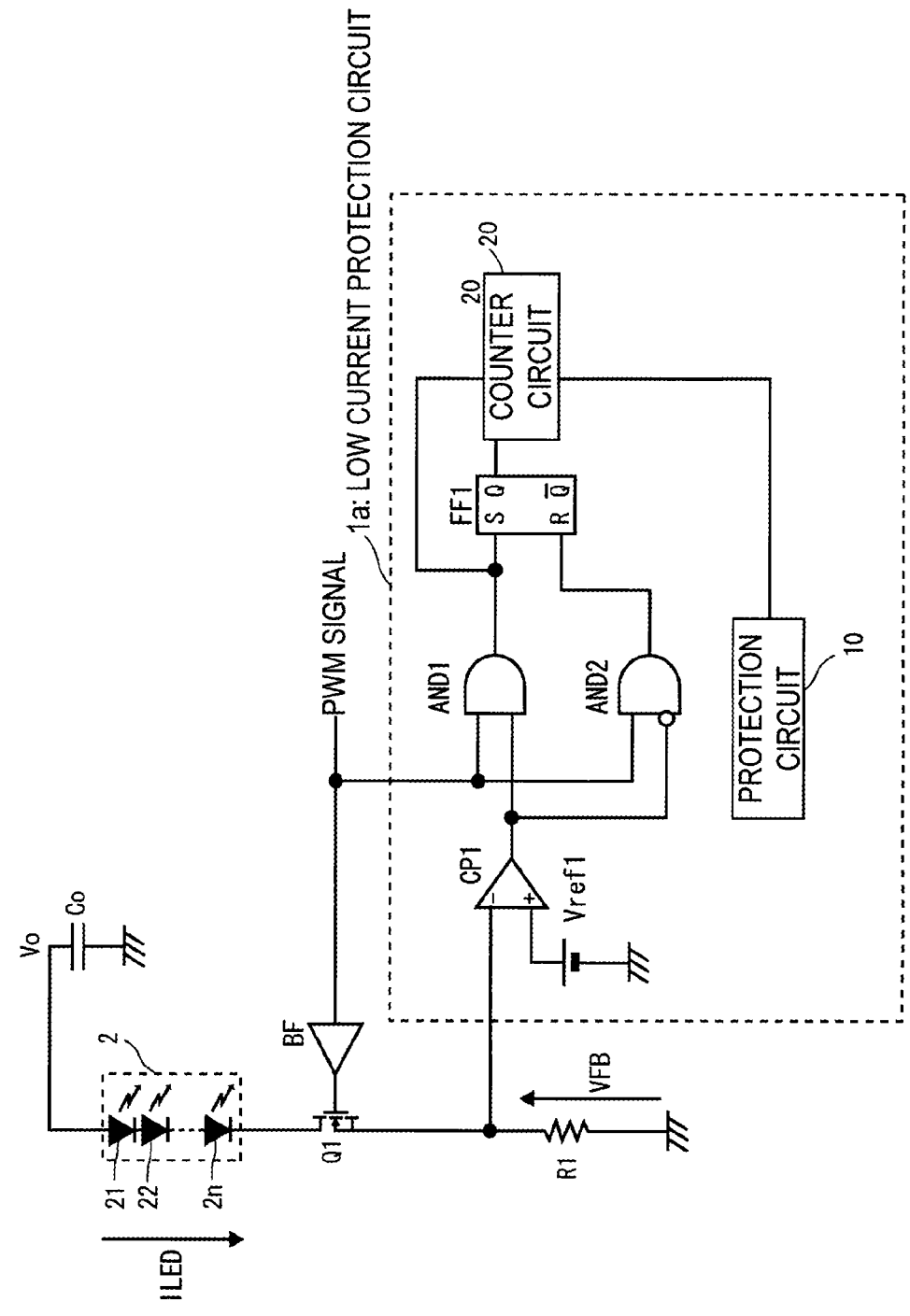
FIG. 5 is a circuit configuration view illustrating a circuit configuration in another illustrative embodiment of the low current protection circuit of this disclosure.

Meanwhile, in this illustrative embodiment, the charging amount of electrical charges for the capacitor C1 is changed depending on the duty ratio of the PWM signal, thereby changing the masking time period. However, as shown in FIG. 5, when a clock signal can be generated, the making time period may be changed by count time of a counter circuit 20. In a low current protection circuit 1a shown in FIG. 5, the output of the AND circuit AND1 and the output from the output terminal Q of the flip-flop circuit FF1 are input to the counter circuit 20, and an output of the counter circuit 20 is input to the protection circuit 10. The counter circuit 20 counts in case where the output from the output terminal Q of the flip-flop circuit FF1 is an H level and where the output of the AND circuit AND1 is an H level, and then the counter circuit 20 counts sets the output thereof to be an H level after counted of a predetermined number. When the output from the output terminal Q of the flip-flop circuit FF1 becomes an L level, the counter circuit resets the count. Thereby, it is possible to change the count time of the counter circuit 20, depending on the duty ratio of the PWM signal, and to thus change the masking time period.

As described above, according to the illustrative embodiments, the constant-current power-supply device supplies power from an input-side to an output-side in synchronization with the PWM signal turning on-and-off the LED array 2 and drives the LED array 2 with the set constant current by using the power supplied to the output-side, and the constant-current power-supply device is provided with the low current protection circuit 1 that performs the low current protection operation by detecting the lowering of the LED current ILED flowing through the LED array 2. The low current protection circuit 1 has the load current detection unit (the detection resistance R1) for detecting the LED current ILED; the low current detection unit (the comparator CP1) for detecting the lowering of the LED current ILED by comparing the LED current ILED detected as the voltage VFB by the detection resistance R1 and the preset reference voltage Vref1; the protection circuit 10 for performing the low current protection operation when the lowering of the LED current ILED is detected by the comparator CP1; and the masking unit (the comparator CP2) for masking the low current protection operation of the protection circuit 10 from when the lowering of the LED current ILED is detected by the comparator CP1 to when the masking time period depending on the duty ratio of the PWM signal elapses.

According to the above configuration, it is possible to appropriately set the masking time period during which the low current protection operation of the protection circuit is masked, depending on the duty ratio of the PWM signal.

Further, according to the above illustrative embodiments, the masking time period when the duty ratio of the PWM signal is low is set to be longer than the masking time period when the duty ratio of the PWM signal is high.

According to this configuration, when the duty ratio of the PWM signal is low, the masking time period during which the low current protection operation of the protection circuit is masked is prolonged to suppress the false detection. When the duty ratio of the PWM signal is high, the masking time period during which the low current protection operation of the protection circuit is masked is shortened to suppress a component from being damaged due to heat generation and the like before the low current protection operation is made.

Further, according to the above illustrative embodiments, the masking time period is set to the time period until the cumulative time of the on-duty of the external pulse signal becomes the predetermined time. That is, the electrical charges are charged in the capacitor C1 with the constant current only when the PWM signal is in the on-duty and it is detected that the voltage Vdc reaches the reference voltage Vref2. Therefore, the cumulative time of the on-duty of the PWM signal is proportional to the charging amount for the capacitor C1.

According to this configuration, although the time period during which the abnormality detection signal upon the startup is detected is changed depending on the increase time of the output voltage Vo, since the masking time period can be determined depending on the cumulative time of the on-duty of the PWM signal due to the increase time of the output voltage Vo, it is possible to appropriately mask the time period during which the abnormality detection signal upon the startup is detected.

This disclosure is not limited to the above illustrative embodiments and the illustrative embodiments can be appropriately changed within the scope of the technical spirit of this disclosure. Also, the number, positions, shapes and the like of the constitutional members are not limited to the illustrative embodiments and can be adapted to the number, positions, shapes and the like suitable for the implementation of this disclosure. Meanwhile, in the respective drawings, the same constitutional elements are denoted with the same reference numerals.

What is claimed is:

1. A low current protection circuit, which is provided in a constant-current power-supply device that supplies power from an input-side to an output-side in synchronization with an external pulse signal turning on-and-off a load and drive load with a set constant current by using the power supplied to the output-side and which is configured to detect a lowering of a load current flowing to perform a low current protection operation, the low current protection circuit comprising:
 a load current detection unit configured to detect the load current;
 a low current detection unit configured to detect the lowering of the load current by comparing the load current detected by the load current detection unit and a preset reference value;
 a protection unit configured to perform the low current protection operation when the lowering of the load current is detected by the low current detection unit; and
 a masking unit configured to mask the low current protection operation of the protection unit from when the lowering of the load current is detected by the low current detection unit to when a masking time period depending on a duty ratio of the external pulse signal elapses.

2. The low current protection circuit according to claim 1, wherein the masking time period when the duty ratio of the external pulse signal is low is set to be longer than the masking time period when the duty ratio of the external pulse signal is high.

3. The low current protection circuit according to claim 1, wherein the masking time period is set to a time period until cumulative time of an on-duty of the external pulse signal becomes a predetermined time.

4. The low current protection circuit according to claim 2, wherein the masking time period is set to a time period until cumulative time of an on-duty of the external pulse signal becomes a predetermined time.

* * * * *